United States Patent [19]
Katsen et al.

[11] Patent Number: 5,803,958
[45] Date of Patent: *Sep. 8, 1998

[54] BLACK INK JET INK COMPOSITION

[75] Inventors: Boris Joseph Katsen, Longmeadow; Richard S. Himmelwright, Wilbraham; Nate R. Schwartz, South Hadley; Barbara Jones Stewart, Springfield, all of Mass.

[73] Assignee: Rexam Graphics Inc., South Hadley, Mass.

[*] Notice: The term of this patent shall not extend beyond the expiration date of Pat. No. 5,746,817.

[21] Appl. No.: 698,868

[22] Filed: Aug. 16, 1996

[51] Int. Cl.$^6$ .................................................. C09D 11/02
[52] U.S. Cl. .................................. 106/31.65; 106/31.85; 106/31.86
[58] Field of Search ............................. 106/31.65, 31.85, 106/31.86

[56] References Cited

U.S. PATENT DOCUMENTS

| | | | |
|---|---|---|---|
| 4,188,236 | 2/1980 | Robertson et al. | 106/504 |
| 5,026,427 | 6/1991 | Mitchell et al. | 106/31.6 |
| 5,310,778 | 5/1994 | Shor et al. | 106/31.65 |
| 5,344,487 | 9/1994 | Whalen-Shaw | 106/31.65 |

*Primary Examiner*—Helene Klemanski
*Attorney, Agent, or Firm*—Burns, Doane, Swecker and Mathis L.L.P.

[57] ABSTRACT

Provided is a black ink jet ink which exhibits excellent non-fading properties. The ink jet ink is comprised of water, carbon black, cyan and magenta pigments, a water immiscible organic compound exhibiting a high boiling point, and a water miscible compound. The combination of the water immiscible compound and the water miscible compound provides for excellent anti-crusting properties.

25 Claims, No Drawings

BLACK INK JET INK COMPOSITION

BACKGROUND OF THE INVENTION

The present invention relates to an improved black ink jet ink, and in particular a black pigmented ink jet ink. The present invention relates to black pigmented ink jet inks which exhibit excellent printing properties, is waterfast and particularly lightfast.

Ink jet recording systems are advantageous in that they make very little noise when recording, can be readily matched to color recording, and can also obtain the recorded image with high resolution at a high speed. Inks which are suitable for use in an ink jet printing system should display a consistent drop breakup length, drop velocity and, for synchronous ink jet printing, drop charge under set operating conditions. Conventional ink jet inks are complex multi-component systems based on water soluble dye(s), further containing polymers, solubilizing agents, chelating agent and biocides.

Several drawbacks, however, plague the use of dye-containing, water-based inks. Dyes are not as lightfast and waterfast as pigments. Furthermore, the water solubility of the dyes limits their use in that the images cannot get wet or be used outdoors. Dyes also tend to wick and bleed into uncoated and rough papers. The degree of spreading depends upon the paper used. Thus, the range of paper which can be used with dye-based inks is limited. In addition there is a loss in image resolution due to feathering and intercolor bleeding of image characters on the paper.

Because of the limitations of the water-soluble dye approach, researchers have worked with pigment-based inks. Although pigment-based inks are potentially more lightfast and waterfast than dye based inks and can be used with a wide range of printing media such as paper, coated paper, transparent and white polyesters and vinyls, and various types of synthetic paper and castcoated materials, it is still very difficult to obtain particles small enough which do not settle and clog the orifice of the printing system. The orifice must remain open for a wide range of operating conditions, e.g., temperature and humidity. Problems of feathering, migration and image loss can also occur with pigment inks.

Conventional processes for preparing pigment-based ink jet inks include blending ink jet materials together and then mixing and grinding with a known dispersing device such as a ball mill, homogenizer, sand mill or roll mill. U.S. Pat. No. 4,597,794 describes a process wherein the pigmented ink jet ink is prepared by dispersing fine particles of pigments in an aqueous dispersion medium containing a polymer having both a hydrophilic and hydrophobic construction portion. The components were prepared using the aforementioned standard processes.

U.S. Pat. No. 5,026,427 relates to a process for making pigmented ink jet inks. The process involves mixing at least one pigment and at least one pigment dispersant in a medium comprised of water or water in a water soluble organic solvent. The pigmented ink mixture is then deflocculated by passing it through a microfluidizer.

U.S. Pat. No. 5,160,370 relates to a pigmented ink which involves a pigment, a water soluble resin, a water soluble organic solvent and water. The water soluble resin is added in an amount such that the amount of resin not absorbed on the pigment is about two percent or less. Furthermore, the water soluble organic solvent comprises at least one polyhydric alcohol and an aliphatic monohydric alcohol, such as ethanol.

Due to the complex nature of the composition of an ink, the composition and the method used to produce the ink can be quite sensitive. There is a need in the industry to improve the inks used. Despite the ongoing attempts to solve many of the problems which exist, there is still a need to improve the pigmented inks used in ink jet printers, both from the standpoint of the image printed and the printability of the inks. This is particularly true for the black ink, where lightfastness is of particular importance.

Accordingly, one object of the present invention is to provide a novel black ink jet ink composition.

Another object of the present invention is to provide a black ink jet ink composition which demonstrates improved printability.

Yet another object of the present invention is to provide a black ink jet ink which prints an image of high density and with high resolution.

Still another object is to provide such a black ink jet ink which prints an image exhibiting excellent water and lightfastness.

Another object of the present invention is to provide a process for preparing such a novel black pigmented ink jet ink.

These and other objects of the present invention will become apparent upon a review of the following specification and the claims appended thereto.

SUMMARY OF THE INVENTION

In accordance with the foregoing objectives, provided is an ink jet ink comprised of water, carbon black, cyan pigment, magenta pigment, a water immiscible organic compound exhibiting a high boiling point, preferably greater than 280° C., and a water miscible compound, with at least part of the water immiscible compound being absorbed on the cyan and magenta pigments. It has been found that the presence of the water immiscible organic compound together with the water miscible compound provides an ink jet ink which avoids plugging problems, and exhibits excellent drying times on the surface, particularly paper, it is printed. Furthermore, it has been found that the printed matter obtained with the black ink of the present invention exhibits excellent water and lightfastness, and that the printed material also exhibits excellent resolution. The presence of satellites is greatly diminished and the size of any satellites is minimized. This is accomplished with a low concentration of pigment, and hence an ink having a low viscosity compared to the prior art pigmented ink jet inks.

A particular advantage of the black ink jet ink of the present invention is that it exhibits excellent non-fading properties or lightfastness. The ▲E (color fading parameter) is less than 5, and preferably less than 2, after 600 hours.

In another embodiment, there is provided a process for preparing the black ink jet ink of the present invention. The process involves creating a dispersion of the components of the ink and subjecting the dispersion to comminution. Preferably, the comminution is effected by use of a microfluidizer. The microfluidizer thereby creates a microemulsion, which generally comprises emulsified pigment in water due to the absorption of the water immiscible compound by the pigment. It is believed that through the absorption by the cyan and magenta pigments of the water immiscible compound that many of the advantages of the present invention are realized. The carbon black may also absorb water immiscible organic compound. Subsequent to comminution, a separation step is practiced. Subsequent addition of water miscible compound and/or water to dilute the formulation to its final composition is then generally made. In an alternative embodiment, the carbon black can be added to the ink formulation after the above procedure is followed for the magenta and cyan pigments. The carbon black can simply be mixed into the ink formulation.

In another embodiment of the present invention, there is provided a process of printing using the ink jet ink of the present invention. The printing is effected by using the black ink jet ink in an ink jet printer, and applying the ink to a printing medium, which can, among other media, involve a coated ink jet paper, plain paper, transparencies, paper suitable for outdoor use, as well as other materials suitable for an outdoor use, such as polyvinyl chloride, polyester, polyethylene and such. The printer can be a desk printer or a wide format ink jet ink printer.

DETAILED DESCRIPTION OF THE PREFERRED EMBODIMENTS

Any carbon black particle can be used in the present invention. Such carbon black particles are commercially available. It is most preferred, however, to use a resin free carbon black such as the Cabot Carbon Black CSX-440L. The carbon blacks can be used in any form commercially available.

A wide variety of organic and inorganic cyan and magenta pigments, alone or in combination, may be selected to make the ink of the present invention. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 10 micron. Preferably, the pigment particle size should range from 0.005 to 1 micron, more preferably, from 0.005 to 0.3 micron, and most preferably the size of the pigment particle should average less than 200 nm, and most preferably less than 150 nm.

The selected magenta or cyan pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation as in a process of preparing the inks from dry pigments. A premix of the pigment already dispersed in an aqueous medium can also be used as a starting material for preparing the ink of the present invention.

Representative commercial pigments that can be used in the form of a water wet presscake or premix include Super Seatone Blue G.S. (Hilton Davis of Cincinnati, Ohio); Super Seatone Magenta (Hilton Davis); Flexiverse Yellow (Sun Chemical Corp., Cincinnati, Ohio) Heucophthal® Blue BT-585-P, Toluidine Red Y (C.I. Pigment Red 3), Quindo® Magenta (Pigment Red 122), Magenta RV-6831 presscake (Miles Laboratories, Harmon Division, Haledon, N.J.), Sunfast® Magenta 122 (Sun Chemical Corp., Cincinnati, Ohio), Indo® Brilliant Soarlet (Pigment Red 123, C.I. No. 71145), Toluidine Red B (C.I. Pigment Red 3), Watchung® Red B (C.I. Pigment Red 48), Permanent Rubine F6B13-1731 (Pigment Red 184), Pigment Scarlet (C.I. Pigment Red 60).

Other typical pigments useful in the ink formulations of the present invention are Phthalocyanine Blue (C.I. 74260), Permanent Red 4R (C.I. 12335), Brilliant Carmine 6B (C.I. 15850) and Quinacridone Red (C.I. 46500).

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Among the most preferred pigments to be used in the ink formulations and process of the present invention are C.I. Pigment Red 122, and C.I. Pigment Blue 15.

The amount of carbon black and cyan and magenta pigments contained in the ink jet ink formulation generally ranges from 2–10 wt %, based on the total ink formulation. More preferably, the amount of pigment ranges from about 3.5–7 wt %.

The inks of the present invention also comprise a water immiscible organic compound. By water immiscible, for purposes of the present invention, is meant an organic compound which dissolves in water to a concentration of no more than about 0.5% by weight. The water immiscible organic compound is a high boiling point compound. Generally, the organic compound exhibits a boiling point of at least about 200° C. and more preferably 280° C. or greater. The high boiling point should be high enough to prevent a high evaporation rate in the dispensing nozzle.

Suitable water immiscible organic compounds are commercially available and are generally known as plasticizers, with those most preferred being of the phthalate family. The most preferred organic compound is dibutyl phthalate. Either the ortho or meta isomer can be used. Additional commercially available compounds which can be used as the water immiscible organic compound in accordance with the present invention, include diethylhexyl phthalate, butylbenzyl phthalate, butyloctanoate and diisooctylphthalate. Other suitable, but less preferred, materials are the Benzoflex materials, such as dipropylene glycol dibenzoate (Benzoflex 9–88); a 1:1 mixture of dipropylene glycol dibenzoate and diethylene glycol dibenzoate (Benzoflex 50); polyethylene glycol dibenzoate (Benzoflex 200); 2,3,4-trimethyl-1,3-pentanediol dibenzoate (Benzoflex 354) and propylene glycol dibenzoate (Benzoflex 400).

The high boiling water immiscible organic compound is at least in part absorbed by the pigment. Absorption of the high boiling water immiscible organic compound by the pigment protects the pigment from water evaporation, and hence having the pigment dry out. During the comminution step, preferably accomplished by a microfluidizer or similar equipment, a microemulsion is formed comprised of the emulsified pigment in water. The emulsion is created due to the water immiscible organic compound being absorbed on the pigment. It is preferred that sufficient water immiscible organic compound is absorbed by the cyan and magenta pigments to permit the formation of such a microemulsion. Absorption of the high boiling water immiscible organic compound by the pigment, therefore, leads to the stability of the ink jet ink and the avoidance of problems with plugging. The immiscible organic compound helps to prevent water loss from the pigment so that the pigment does not dry out, and therefore it does not form a crust. Generally, even if a crust does form, it will be very soft and can be easily cleaned.

In combination with the high boiling water immiscible organic compound is a water miscible compound. Among the water miscible compounds that are suitable, are compounds which generally boil about 160° C. or greater. It is important that the boiling point of the compound is at least high enough to avoid a high evaporation rate while sitting in the dispensing nozzle of an ink jet printer. The water miscible compound therefore helps to keep water evaporation to a minimum, thereby aiding in the anti-crusting of the ink jet inks. The water miscible compound can also help to deliver the water immiscible compound to the pigment for absorption if the water immiscible compound is somewhat miscible or soluble in the water miscible compound.

Suitable water miscible compounds include diacetone alcohol, 1,2-propanediol, 1,3-propanediol and hexadecanol, as well as diethylene glycol, polyethylene glycol (MW of 200 preferred), triethylene glycol, tetraethylene glycol, polyethylene glycol dilaurate, glycerin, 2-pyrrolidone, methyl pyrrolidone, diethylene glycol monoethyl ether, ethylene glycol monobutyl ether and neopentyl glycol. Alcohols and glycols are preferred, with diacetone alcohol, 1,2-propanediol, 1,3-propanediol, diethylene glycol and polyethylene glycol (200) being the most preferred water miscible compounds, particularly when used in combination with dibutyl phthalate.

When preparing the ink jet ink formulation, it is important in the early stages when the components are mixed that the amount of water miscible compound, particularly if it acts as a solvent for the water immiscible compound, is not so great as to prevent the water immiscible compound from being absorbed on the pigment. Generally, the weight ratio of water miscible to water immiscible compound should be less than 10 in the comminution stage, more preferably less than 3 and most preferably about 1, to ensure good absorption of the water immiscible compound by the pigment. Additional water miscible compound and water can be added subsequently to achieve the final ink jet ink formulation with its desired viscosity.

In preparing the pigments used in the black ink formulation of the present invention, the cyan and magenta pigments can be processed separately and then simply mixed with the carbon black, which is generally available in dispersion form, to provide the final ink formulation. Alternatively, the cyan and magenta pigments can be processed together as described above and then mixed together with the carbon black to form the final ink formulation. Or, the carbon black, cyan and magenta pigments can all be processed together.

The final ink jet ink composition of the present invention generally comprises from about 3.5 to 10 wt % solids. Thus, the viscosity of the ink is generally lower than that of prior art inks. In general, the formulation generally comprises from 2 to 10 wt % pigment (carbon black, cyan and magenta pigments), from 0.1 to 1.0 wt % water immiscible compound, from 0.1 to about 35 wt % water immiscible compound, and the remainder water. More preferably, for desk printers, the formulation comprises from about 3.5 to 7 wt % pigment based upon the total formulation, from about 0.1 to 1.0 wt % water immiscible compound, and from 0.5 to 10 wt % water miscible solvent, with the remainder being water. For wide format printing, the formulation preferably comprises from about 2 to 10 wt % pigment, from 0.1 to 1.0 wt % water immiscible compound, and from 10 to 35 wt % water miscible compound, with the remainder being water.

The ink jet ink composition of the present invention exhibits significant properties. For example, the ink is improved with regard to "decapping time". This is the time that the cartridge can be left in the open and still restarted without any plugging. The use of the combination of the water immiscible organic compound together with the water miscible compound provides a pigmented ink with excellent decapping time. The cartridge, after use, can be left for significant periods of time without plugging. Restarting of the printing process can occur at any time afterwards without a problem.

The black inks of the present invention also exhibit excellent waterfastness, stability and drying times on the printed medium (particularly paper). The combination of the high boiling point water immiscible organic compound with the water miscible compound allows one to formulate a black pigmented ink jet ink with the properties desired for commercial use. A most striking behavior is that an image made by the pigmented inks of the present invention can be left under a tap water stream for more than an hour when printed on conventional media (especially on a plastic substrate), without any run off of cyan, magenta, yellow or any of the processed colors. The optical density of the initial and water exposed media is practically unchanged even after rubbing the image with a finger or piece of cloth.

The most appreciable advantage of the black ink jet inks of the present invention, however, is their lightfastness. They have excellent non-fading properties, which is quite surprising for a black ink. The Delta E is generally less than 5, and preferably less than 2 after 600 hours of exposure. The Delta E is the Euclidian distance between two colors in a uniform color space, set-up so one unit is equal to a "just noticeable difference" for the average human observer. The Delta E is conventionally measured by means of a spectrophotometer. The exposure to effect accelerated fading is exposure to a 100 Kilolux intensity Xenon lamp with long and short UV capabilities. Such Delta E measurements can be made using commercial apparatus such as the Atlas fadometer. It has been found that the combination of the carbon black with the magenta and cyan pigments in the present ink formulation provides a black ink having surprisingly exceptional non-fading (lightfast) properties.

The ink jet ink of the present invention can also include conventional additives, such as a surfactant, or an antibacterial agent. The composition can also comprise a fatty acid derivative such as a metal salt, or an ester such as polythylene and the like. A stearate compound is preferred. Stearate compounds which are generally not soluble in water, but may be accompanied by a polymeric electrolyte to allow dispersion in the water. The stearate compound can be employed in a range from about 0.5 to 5 wt % based upon the total ink formulation, and more preferably from about 0.1 to 3 wt %. The stearate compound presence aids in providing a printable ink with excellent stability and excellent image qualities. The stearate compound can help improve both the stearic stabilization and electrokinetic stabilization of the ink pigments. The stearate compound can be any of those commercially available, such as aluminum or zinc stearate. Generally, the stearate compound can be expressed in a formula as $M(OH)_n(C_{17}H_{35}COO)_m$, where M is the metal, e.g., aluminum or zinc, and n ranges from 0 to 3, with m ranging from 0 to 3.

The process for preparing the ink jet ink of the present invention involves grinding a dispersion of the pigment or pigments, water, water immiscible and water miscible compounds in order to comminute the particles, preferably until a bi-modal distribution of pigment particles is obtained. The creation of a microemulsion is generally achieved during this step. The term "bi-modal distribution" refers to a distribution of particles into at least two separate fractions of different average particle size. Generally, only two separate fractions or modes are observed. If more than two modes are observed, then the first mode will be considered the fraction of particles having the smaller average particle size and the second mode will encompass the remaining fractions.

The comminuting of the particles can take place in a single step, or in a two-step process. For example, the dispersion can first be milled in any generally appropriate and available mill, e.g., such as a ball mill, sand mill or media mill. Media mills which employ a horizontal media mill such as those manufactured by Netzsch, Eiger, Premier, and the like are efficient, and dispersions prepared using a horizontal media mill have been found to produce excellent colloidal dispersions which provide inks exhibiting excellent stability. A media mill can therefore be used to reduce the size of the particles to a certain level.

Excellent colloidal dispersions can also be prepared using other mills, e.g., an impingement mill or microfluidizer. In fact, it has been found that use of an impingement mill is most effective and efficient in reproducibly and consistently achieving a bi-modal distribution of particles within the dispersion. It is also most effective and efficient in creating a microemulsion of pigment (coated with the water immiscible compound) in water. An impingement mill operates by subjecting the dispersion to a pressure of as much as 35,000 psi in a hydraulic pump. The pump pushes the dispersion into a decompression chamber where the particles of the dispersion impinge on one another to comminute the particles. The comminution is effected both by the forces of impingement and cavitation. No foreign grinding medium is involved, which promotes the purity of the resulting dispersions. Descriptions of an impingement mill and their operation are also found, for example, in U.S. Pat. Nos. 4,533,254 and 4,783,502. Impingement mills are commercially available, e.g., Model M110T or M110Y, manufactured by Microfluidics, Inc., or the high-pressure homogenizer, filter extruder Emulsi Flex™ available from Aestin, Inc. of Ottawa, Canada.

Once the comminuting of the pigment particles is accomplished, a separation of the dispersed particles into two fractions is made. Preferably, a bi-modal distribution of the dispersed particles is achieved, in which case the separation is into the two separate modes of particles created by the comminuting. Generally, one of the modes will have an average particle size of about 300 nanometers or less, more preferably of about 200 nm or less, and most preferably of about 150 nm or less. It is this mode which is recovered and saved for use in the preparation of the ink formulations. The dispersion comprised of the second mode of particles having an average particle size greater than 300 nanometers can be used for other applications, or may be simply returned back to the manufacturing process for further grinding and separation.

The separation step can be achieved by any appropriate means available. It is preferred, however, that microfiltration or centrifugation be employed for reasons of practicality and efficiency. In particular, centrifugation is most preferred as it has been found to be quite efficient and effective in the separation of particles of 300 nanometers and less from the bulk of larger particles.

If desired, a second portion of the water miscible compound, water and/or water immiscible compound can be mixed together with the separated portion to bring the ink formulation to its final composition. For example, a first portion of water miscible compound can be added to the initial dispersion which is comminuted, followed by separation. A second portion of the water miscible compound plus additional water can then be added to the separated ink composition in order to form the final ink. This is preferred in order to enhance the stability of the ink and ensure good absorption of the water immiscible compound by the pigment.

In another preferred embodiment, the final ink formulation, prior to placing it in an ink jet ink cartridge, can be deaerated in a continuous or batch type deaerator. Such deaerators are available commercially from, for example, Freyma Corp. of Edison, N.J.; Koruma Corp. of Switzerland; or Jayco Corp. in the United States. Once the final product has been deaerated, it can also be filtered through a 1 micron filter to retain any dried particles or agglomerates of foreign materials. This filtration step generally lowers the viscosity from 1 to 2 cps. The ink can then be easily placed into the cartridge for use in a printer.

The black ink jet ink of the present invention can be printed with any conventional ink jet printer, and can be printed on any ink jet medium, e.g., plain paper, coated ink jet paper or paper suitable for outdoor use, as well as vinyl media, overhead transparencies, and synthetic media such as white polyester media. The stability of the ink formulation also allows long storage periods without any loss of printability. Storage with the printing orifice in contact with a polyethylene glycol/water mixture, e.g., the mixture saturating a pad, has also been found to prevent nozzle clogging. If the nozzle does happen to clog, use of such a mixture as a cleaner can easily unclog the nozzle.

The present invention will be further illustrated by the following examples, which are provided purely for illustration and are not meant to be unduly limiting. Where percentages are mentioned in the following examples, and throughout the specification, the parts and percentages are by weight unless otherwise specified.

EXAMPLES

Example 1

A black ink jet in accordance with the present invention was prepared having the following composition.

| Ingredient | Weight Percent |
| --- | --- |
| Cyan Pigment | 1.65 |
| Magenta Pigment | 1.65 |
| Carbon Black (Cabot CSX-440L) | 1.70 |
| Diethylene glycol | 30 |
| Diisooctylphthalate | 0.5 |
| Proxel GXL | 0.03 |
| Water | 65.5 |

The ink was placed in a Laser Master™ Big Ink System, which corresponds to 4–5 cartridges on a simulator, and was printed continuously. The prints were tested for fading using an Atlas fadometer. Waterfastness and wet rub resistance were also tested. The waterfastness was tested by placing a print into a sink and having tap water run over the print. Wet rub resistance was observed by rubbing the image with a finger while the tap water was still running. Substantially no fading was observed as the Delta E after 600 hours was less than 2. The waterfastness and wet rub resistance were also very good.

Example 2

A black ink jet ink in accordance with the present invention was prepared having the following composition.

| Ingredient | Weight Percent |
| --- | --- |
| Cyan Pigment | 1.65 |
| Magenta Pigment | 1.65 |
| Carbon Black (HD702) | 1.70 |
| Diethylene glycol | 30 |
| Diisooctylphthalate | 0.5 |
| Proxel GXL | 0.03 |
| Water | 65.5 |

The ink was placed into the cartridge of a Laser Master™ Big Ink System such as in Example 1 and prints made. The prints were again tested and found to exhibit excellent waterfastness and non-fading properties. Some kogation, however, was noted during continuous printing.

Example 3 (Comparative)

The subject example demonstrates that when a yellow pigment is used in combination with the carbon black, fading occurs. This example demonstrates the importance of the combination of the carbon black with only cyan and magenta pigments for achieving the most advantageous results.

A black ink jet ink was prepared having the following composition.

| Ingredient | Weight Percent |
| --- | --- |
| Cyan Pigment | 1.10 |
| Magenta Pigment | 3.0 |
| Yellow Pigment | 0.90 |
| Carbon Black (Projet Fast Black II) | 1.0 |
| Diethylene glycol | 30 |
| Proxel GXL | 0.05 |
| Water | 64 |

The ink was placed in the cartridge of the Laser Master Big™ Ink System and prints were made. The prints were tested and found to exhibit fading after 200 hours, with a Delta E of greater than 10. The wet rub resistance of the prints were also very low.

Example 4 (Comparative)

A black ink jet ink was prepared using simply the carbon black of Example 1 without any cyan or magenta pigments. The final ink jet ink formulation had the following composition.

| Ingredient | Weight Percent |
| --- | --- |
| Carbon Black (Cabot Black CSX-440L) | 5 |
| Diethylene glycol | 30 |
| Proxel GXL | 0.03 |
| Water | 65 |

The ink was placed in the cartridge of the Laser Master Display Maker™ and prints were made. The prints were again tested for waterfastness. No water resistance was demonstrated by the ink as the ink ran off the paper when placed under a running tap.

Example 5 (Comparative)

A black ink jet ink was prepared which had the following composition.

| Ingredient | Weight Percent |
| --- | --- |
| Cyan Pigment | 1.10 |
| Magenta Pigment | 3 |
| Yellow Pigment | 0.9 |
| Carbon Black (Cabot Black CSX-440L) | 1 |
| Diethylene glycol | 30 |
| Proxel GXL | 0.05 |
| Water | 64 |

The ink was tested in accordance with Example 1 and found to fade excessively with the Delta E being greater than 10 after 400 hours of exposure using a Xenon lamp Atlas fadometer.

Example 6

A black ink jet ink composition was prepared in accordance with the present invention which had the following composition:

| Ingredient | Weight Percent |
| --- | --- |
| Carbon Black (Cabot Black CSX-440L) | 3.0 |
| Cyan pigment | 0.5 |
| Magenta pigment | 1.5 |
| Duthylene glycol | 25 |
| 1,2-propane diol | 5 |
| Proxel GXL | 0.03 |
| Water | 64.97 |

The ink was tested in accordance with Example 1 for fading of printed matter and waterfastness. Both characteristics were excellent. The prints made were also observed to have good line definition.

What is claimed:

1. An ink jet ink formulation comprised of carbon black, cyan and magenta pigments, water, a water immiscible organic compound exhibiting a high boiling point, and a water miscible compound, with at least a portion of the water immiscible organic compound being absorbed by the cyan and magenta pigments.

2. The ink jet ink formulation of claim 1, wherein the amount of organic compound and water miscible compound is sufficient to effect anti-crusting of the ink formulation.

3. The ink jet ink formulation of claim 1, wherein the organic compound exhibits a boiling point of at least about 280° C.

4. The ink jet ink formulation of claim 1, wherein the water immiscible organic compound is selected from the group consisting of dibutyl phthalate, diethylhexyl phthalate, butyloctanoate, butylbenzyl phthalate and diisooctylphthalate.

5. The ink jet ink formulation of claim 1, wherein the water immiscible organic compound is comprised of dibutyl phthalate.

6. The ink jet ink formulation of claim 1, wherein the water immiscible organic compound is comprised of diisooctylphathalate.

7. The ink jet ink formulation of claim 1, wherein the water miscible compound exhibits a boiling point of at least 160° C.

8. The ink jet ink formulation of claim 1, wherein the water miscible compound is selected from the group consisting of diacetone alcohol, 1-3-propanediol and hexadecanol, 1,2-propanediol, diethylene glycol, polyethylene glycol and mixtures thereof.

9. The ink jet ink formulation of claim 10, wherein the water miscible compound is comprised of diacetone alcohol, 1,3-propanediol or diethylene glycol.

10. The ink jet ink formulation of claim 1, wherein the amount of carbon black and pigment in the formulation ranges from about 2 to 10 wt %, the amount of water immiscible organic compound ranges from about 0.1 to 1 wt %, the amount of water miscible compound ranges from about 0.1 to 35 wt %, with the remainder of the formulation comprising water.

11. The ink jet ink formulation of claim 1, wherein the amount of carbon black and pigment in the formulation ranges from about 3.5 to about 7 wt % based upon the weight of the entire formulation, the amount of water immiscible organic compound ranges from about 0.1 to 1.0 wt %, the amount of water miscible compound ranges from about 0.5 to 10 wt %, with the remainder of the formulation comprising water.

12. The ink jet ink formulation of claim 1, wherein the formulation comprises from about 3.5 to about 10 wt % solids.

13. The ink jet ink formulation of claim 12, wherein the water immiscible organic compound is comprised of dibutyl phthalate, and with the dibutyl phthalate comprising from 5 to 20 wt % of the formulation based upon the weight of solids.

14. A process for preparing the ink jet ink formulation of claim 1, wherein a dispersion of the components of the formulation is subjected to comminution followed by a separation step.

15. The process of claim 14, wherein additional water miscible compound is added subsequent to the separation step.

16. The process of claim 14, wherein the separation step comprises centrifugation.

17. The process of claim 14, wherein the comminution is such as to create a bimodal dispersion of the pigment particles, and the separation comprises separating out one of the modes.

18. The process of claim 14, wherein the comminution comprises passing the dispersion of component through a microfluidizer.

19. The process of claim 15, wherein the comminution results in a pigment in water microemulsion.

20. A process for printing which comprises using the ink jet ink formulation of claim 1 in an ink jet printer, and applying the ink to a printing medium with the ink jet printer.

21. The process of claim 20, wherein the medium to which the ink is applied is coated ink jet paper.

22. The process of claim 20, wherein the medium to which the ink is applied is plain paper.

23. The process of claim 20, wherein the medium to which the ink is applied is paper suitable for outdoor use.

24. The process of claim 20, wherein the ink jet printer is a deskjet printer.

25. The process of claim 20, wherein the ink jet printer is a wide format printer.

* * * * *